United States Patent [19]

Kubo

[11] Patent Number: 5,146,475
[45] Date of Patent: Sep. 8, 1992

[54] MAXIMUM-LIKLIHOOD SEQUENCE ESTIMATION APPARATUS

[75] Inventor: Hiroshi Kubo, Kanagawa, Japan

[73] Assignee: Mitsubishi Denki Kabushiki Kaisha, Japan

[21] Appl. No.: 615,236

[22] Filed: Nov. 19, 1990

[30] Foreign Application Priority Data

Nov. 24, 1989 [JP] Japan ................... 1-305907

[51] Int. Cl.⁵ .......................... H04L 27/06
[52] U.S. Cl. ...................... 375/94; 371/43
[58] Field of Search .............. 375/17, 18, 19, 20, 375/34, 94, 96, 103; 371/43, 44

[56] References Cited

U.S. PATENT DOCUMENTS

| | | | |
|---|---|---|---|
| 4,644,564 | 2/1987 | Dolivo et al. | 375/18 |
| 4,748,626 | 5/1988 | Wong | 375/17 |
| 4,885,757 | 12/1989 | Provence | 371/43 |
| 4,888,735 | 12/1989 | Karabed et al. | 371/43 |
| 4,888,775 | 12/1989 | Karabed et al. | 375/18 |

OTHER PUBLICATIONS

Gottfried Ungerboeck, "Adaptive Maximum-Likelihood Receiver for Carrier-Modulated Data-Transmission Systems", *IEEE Transactions on Communications*, vol. COM-22, No. 5, May 1974, pp. 624-636.

Francis R. Magee, Jr. et al., "Adaptive Maximum-Likelihood Sequence Estimation for Digital Signalling in the Presence of Intersymbol Interference", *IEEE Transactions on Information Theory*, Jan. 1973, pp. 120-124.

*Primary Examiner*—Stephen Chin
*Attorney, Agent, or Firm*—Wolf, Greenfield & Sacks

[57] ABSTRACT

A maximum-likelihood sequence estimation apparatus supplied with a received signal for outputting data in accordance with a state selected on the basis of an estimated maximum-likelihood sequence. The apparatus comprises a plurality of channel characteristics estimation circuits provided for respective states and respectively supplying estimated values of channel characteristics for different states to a maximum-likelihood sequence estimation circuit.

6 Claims, 3 Drawing Sheets

MAXIMUM-LIKLIHOOD SEQUENCE ESTIMATION APPARATUS

BACKGROUND OF THE INVENTION

1. Field of the Invention

The present invention relates to a maximum-likelihood estimation apparatus suitable for digital data transmission.

2. Prior Art

FIG. 1 shows a block diagram of a maximum-likelihood sequence estimation apparatus disclosed in the article entitled "Adaptive Maximum-Likelihood Receiver for Carrier-modulated Data-Transmission System" IEEE TRANSACTIONS ON COMMUNICATIONS, Vol. COM-22, p.624–636, No. 5, May 1974 written by Gottfried Ungerboeck. In this figure, a maximum-likelihood sequence estimation circuit 1 is connected between an input port 2 and an output port 3. An input of a delay circuit 4 is also connected to the input port 2 and an output of the delay circuit 4 is connected to an input of a channel characteristics estimation circuit 5. The output of the maximum-likelihood sequence estimation circuit 1 is also connected to another input of the channel characteristics estimation circuit 5, and an output thereof is connected to the maximum-likelihood sequence estimation circuit 1.

In operation, the maximum-likelihood sequence estimation circuit 1 is supplied with a received signal and, using the Viterbi algorithm, calculates "possibilities" for the respective states at the present time from "possibilities" already calculated and stored from the previously received signal and "possibilities" for the respective states which are a combination of data possibly occurring at the present time, on the basis of an estimated value of channel characteristics estimated by the transmission characteristics estimation circuit 5, and decides the maximum-likelihood sequences for the respective states as survivor sequences from the signal received at the present time. The survivor sequences and the "possibilities" for the respective states are stored in the maximum-likelihood sequence estimation circuit 1. The maximum-likelihood sequence estimation circuit 1 then outputs a transmitted signal, that is, data corresponding to the state which has been selected on the basis of the estimated maximum-likelihood sequence.

The delay circuit 4 provides the received signal with a delay equal to a time required for a survivor sequence of any one of the states to merge to a single sequence at a certain previous time. The channel characteristics estimation circuit 5 receives the outputs from the maximum-likelihood sequence estimation circuit 1 and the delay circuit 4, estimates the channel characteristics and supplies the estimated value of the channel characteristics to the maximum-likelihood sequence estimation circuit 1.

FIG. 2 shows an example of a channel having intersymbol interference. In the figure, {In} denotes a transmitted signal sequence and {rn} a received signal sequence. In this channel, shift registers 6a and 6b store two previous samples of the transmitted signal. The received signal is an output from an adder 8 which adds a transmitted signal $I_n$ at the present time multiplied by $f_0$ at a multiplier 7a, a transmitted signal $I_{n-1}$ one sample prior to the present time multiplied by $f_1$ at a multiplier 7b and a transmitted signal $I_{n-2}$ two samples prior to the present time multiplied by $f_2$ at a multiplier 7c. That is, $$rn = f_0 \cdot I_n + f_1 \cdot I_{n-1} + f_2 \cdot I_{n-2}.$$

FIG. 3 is a trellis diagram in the case where a transmitted sequence can take a value of 0 or 1 in the example of FIG. 2. When four states 00, 01, 10 and 11 are provided, the Viterbi algorithm which makes a maximum-likelihood estimation possible can be achieved. Thick lines in the drawing indicate estimated values of the final maximum-likelihood sequence, but it is noted that thin lines remain at a time n as survivor sequences. In other words, the sequence decided at the time n is the sequence decided prior to a time (n−3). This value "3" represents an amount of "decision delay".

In the case of making an estimation of channel characteristics, an estimated value of a transmitted signal made from a received signal is usually required. A mean-square error (MSE) method will be taken here as an example. It is assumed that the symbol (n) indicates a time, Δ indicating an adjusting step size. Then, $$f_i(n+1) = f_i(n) + \Delta e(n) I_{n-1} (i=0, 1, 2)$$

$$e(n) = rn - f_0(n) I_n - f_1(n) I_{n-1} - f_2(n) I_{n-2}.$$

In actuality, however, the "decision delay" causes an estimation to be delayed by three samples.

In the example described above, the "decision delay" is equal to three samples, but an actual model has possibly a longer decision delay. It is thus necessary to set a decision delay to be equal to the maximum out of the possible delays in the delay circuit, which causes an estimation of channel characteristics to be delayed further.

A maximum-likelihood estimation apparatus of the prior art being constructed such as described above, data cannot be decided on until the survivor sequence for each state is "merged" whereby a "decision delay" is produced. Consequently, if data are used for estimating channel characteristics, a delayed follow up to a change in channel characteristics may be made.

SUMMARY OF THE INVENTION

It is an object of the invention to provide a maximum-likelihood sequence estimation apparatus capable of following a change in channel characteristics at a high speed.

In order to achieve the above-described object, a maximum-likelihood sequence estimation apparatus in accordance with the present invention makes an estimation of channel characteristics for every state. To do this, the apparatus is supplied with a received signal and outputs data in accordance with a state selected on the basis of an estimated maximum-likelihood sequence, and comprises:

first means supplied with a received signal and estimated values of channel characteristics for respective states which are a combination of possibly occurring data of a presently received signal so as to estimate a maximum-likelihood sequence using the estimated values of channel characteristics to output survivor sequences for the respective states; and second means responsive to the received signal and the survivor sequences for the respective states output from the first means for outputting the estimated values of channel characteristics for the respective states.

The second means may comprise:

a control means receiving the survivor sequences from the first means and the estimated values of channel characteristics for the respective states so as to output the survivor sequences for the respective states and estimated values of previous channel characteristics determined in accordance with the survivor sequences; and channel characteristics estimation circuits responsive to the received signal and the outputs of the control circuit to output the estimated values of channel characteristics for the respective states.

According to another aspect of the invention, a maximum-likelihood sequence estimation apparatus comprises:

maximum-likelihood sequence estimation means supplied with a received signal and estimated values of channel characteristics for respective states which are a combination of possibly occurring data of a presently received signal to enable a maximum-likelihood sequence to be estimated using the estimated values of channel characteristics to output survivor sequences for the respective states; and channel characteristics estimation means receiving a received signal and the survivor sequences for the respective states output from the maximum-likelihood sequence estimation means for outputting the estimated values of channel characteristics for the respective states.

The maximum-likelihood sequence estimation means may include:

a maximum-likelihood sequence estimation circuit supplied with the received signal and the estimated values of channel characteristics for the respective states; and a control circuit receiving the survivor sequences from the maximum-likelihood sequence estimation circuit and the estimated values of channel characteristics for the respective states from the channel characteristics estimation means so as to output the survivor sequences for the respective states and estimated values of previous channel characteristics determined in accordance with the survivor sequences.

The channel characteristics estimation means may comprise estimation circuits, the number of which is equal to the number of the respective states. The estimation circuits are responsive to the received signal and the outputs of said control circuit to output the estimated values of channel characteristics for the respective states.

The above and other objects and advantages of the invention will become clear from a consideration of the following description taken in connection with the accompanying drawings wherein an embodiment is illustrated by way of example.

DETAILED DESCRIPTION OF THE PREFERRED EMBODIMENTS

Figure 4:
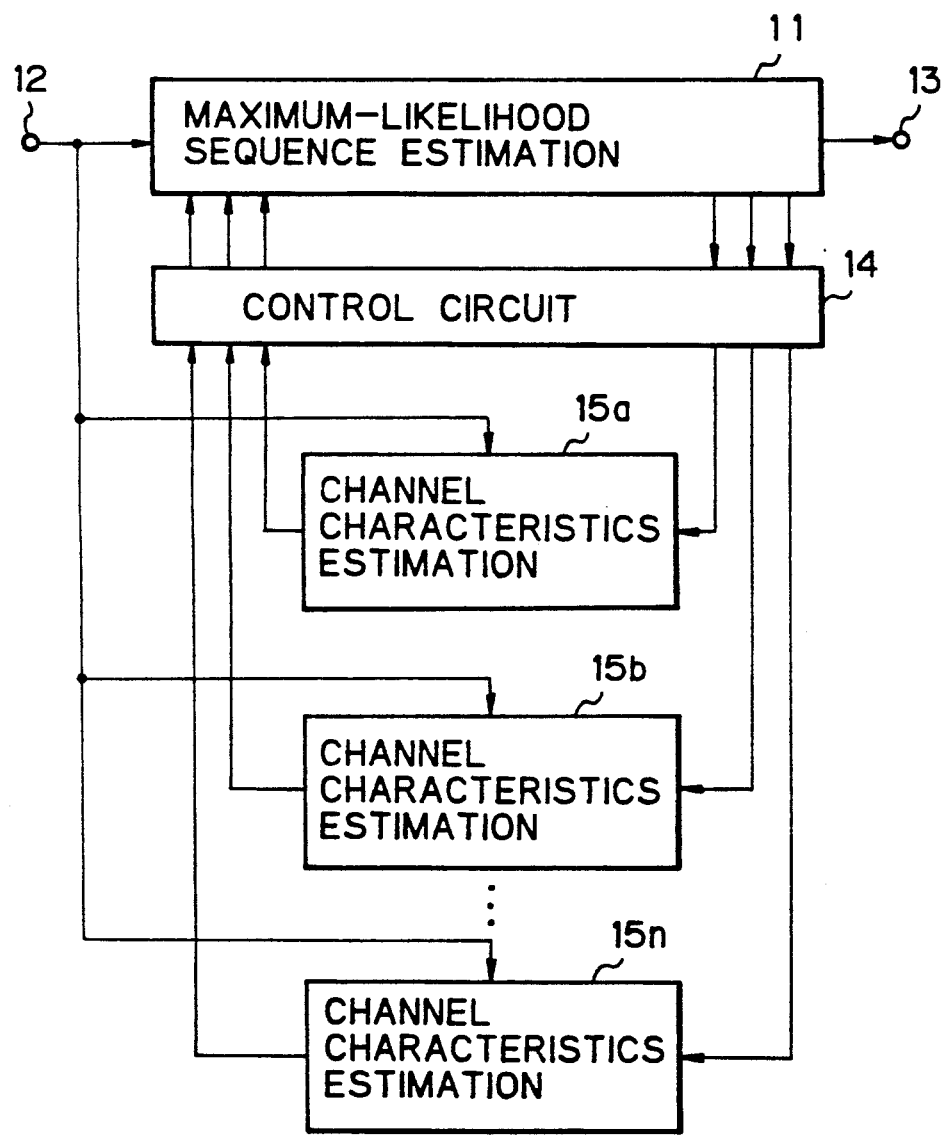
FIG. 4 is a block diagram showing the construction of an embodiment of a maximum-likelihood estimation apparatus according to the present invention.

FIG. 4 is a block diagram showing an embodiment of the present invention. In this figure, a maximum-likelihood estimation circuit 11 is connected between an input port 12 and an output port 13. The input port supplies a received signal to the maximum-likelihood estimation circuit 11 and the output port 13 outputs a transmitted signal.

An input and an output of a control circuit 14 is connected to an output and an input of the maximum-likelihood estimation circuit 11, respectively. The input port 12 and another output of the control circuit 14 is connected to inputs of a plurality of channel characteristics estimation circuits 15a, 15b, ..., 15n, outputs of which are connected to the control circuit 14. The number of channel characteristics estimation circuits is equal to the number of states which are a combination of possibly occurring data of the presently received signal.

In operation, the maximum-likelihood estimation circuit 11 uses a Viterbi algorithm and estimates a maximum-likelihood sequence from estimated values of channel characteristics different in the respective states. More specifically, the maximum-likelihood estimation circuit 11 uses an estimated value received through the control circuit 14 from the channel characteristics estimation circuit 15a as channel characteristics to be used for the state 0, an estimated value received through the control circuit 14 from the channel characteristics estimation circuit 15b as channel characteristics to be used for the state 1, ... and an estimated value received through the control circuit 14 from the channel characteristics estimation circuit 15n as channel characteristics to be used for the state n.

The control circuit 14 receives survivor sequences for the respective states from the maximum-likelihood estimation circuit 11 and estimated values of channel characteristics from the channel characteristics estimation circuits 15a, 15b, ..., 15n. The control circuit 14 supplies the survivor sequences for the respective states and the estimated values of channel characteristics calculated one sample time prior to the present time in accordance with the survivor sequences to the channel characteristics estimation circuits 15a, 15b, ..., 15n, as well as the estimated values of channel characteristics for the respective states at the present time to the maximum-likelihood estimation circuit 11.

The channel characteristics estimation circuit 15a is supplied with the received signal and the outputs of the control circuit 14 in accordance with the survivor sequence for the state 0, and estimates channel characteristics in the case where the survivor sequence for the state 0 has been a correct sequence. Similarly, the remaining channel characteristics estimation circuits 15b, 15c, ..., 15n are supplied with the received signal and the outputs of the control circuit 14 in accordance with the survivor sequences for the state 1, 2, ..., n−1, respectively, and estimate channel characteristics in the case where the survivor sequences for the respective states are correct sequences.

Figure 1:
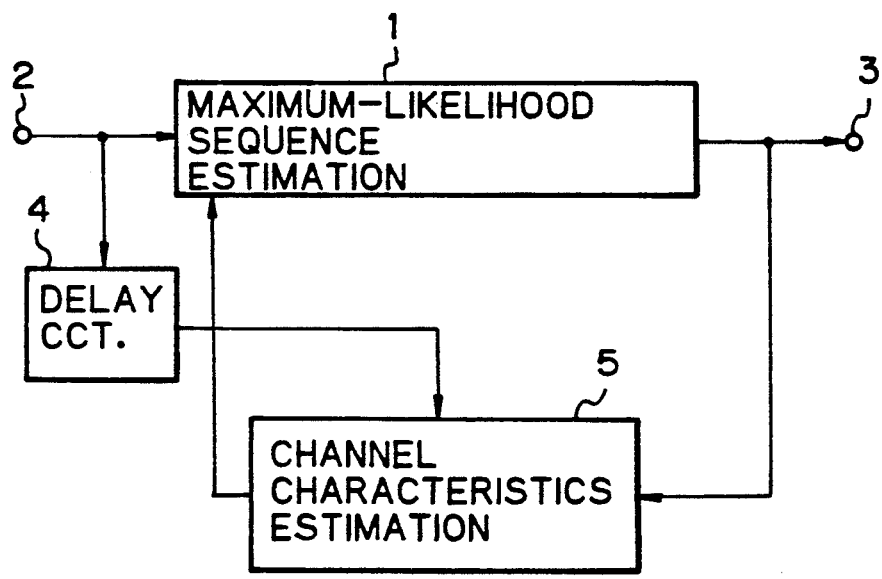
FIG. 1 is a block diagram showing a maximum-likelihood estimation apparatus of the prior art.
Figure 2:
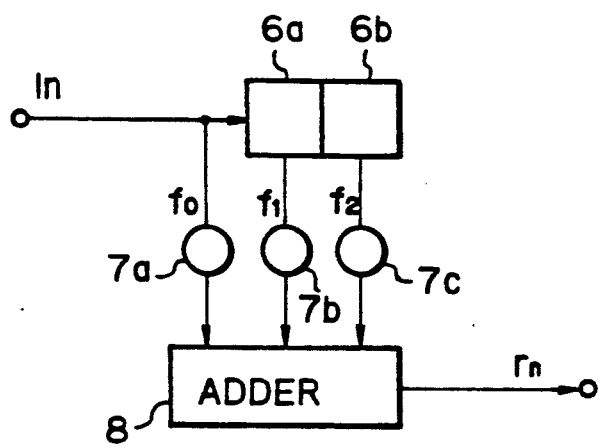
FIG. 2 is a block diagram of an example of a channel model.
Figure 3:
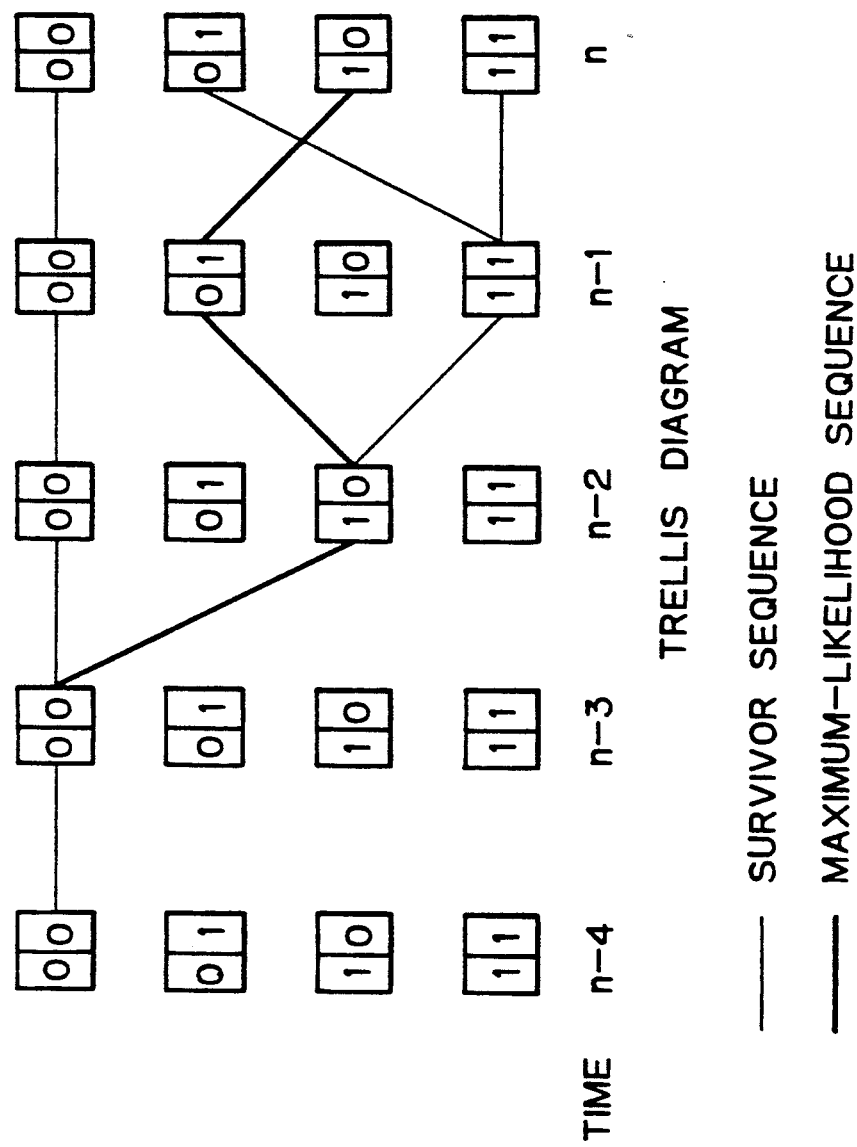
FIG. 3 is a trellis diagram showing the case where a value of a transmitted sequence is 1 or 0 in the example of FIG. 2.

Now, how the maximum-likelihood estimation circuit 11 according to the present invention operates will be explained with reference to FIG. 3. Taking the state 10 (maximum-likelihood sequence) at the time n as an example, the estimated sequence is indicated as 101000 when viewed toward the past from the time n, and comprised of a sequence of the states 10, 01, 01, 00 and 00.

Since the present invention estimates the channel characteristics in accordance with the survivor sequences for the respective states, the survivor sequences are expressed in the following using a MSE method. The subscript $^{xx}$ indicates the state xx:

$$f^{00}(n-3) = f^{00}(n-4) + \Delta e^{00}(n-4)I_{n-i-4}00$$

$$e^{00}(n-4) = r_{n-4} - f_0^{00}(n-4)I_{n-4}00 - f_1^{00}(n-4)I_{n-5}00 - f_2^{00}(n-4)I_{n-6}00$$

$$f^{00}(n-2) = f^{00}(n-3) + \Delta e^{00}(n-3)I_{n-i-3}00$$

$$e^{00}(n-3) = r_{n-3} - f_0^{00}(n-3)I_{n-3}00 - f_1^{00}(n-3)I_{n-4}00 - f_2^{00}(n-3)I_{n-5}00$$

$$f^{10}(n-1) = f^{00}(n-2) + \Delta e^{10}(n-2)I_{n-i-2}10$$

$$e^{10}(n-2) = r_{n-2} - f_0^{10}(n-2)I_{n-2}10 - f_1^{10}(n-2)I_{n-3}10 - f_2^{10}(n-2)I_{n-4}10$$

$$f^{01}(n) = f^{10}(n-1) + \Delta e^{01}(n-1)I_{n-i-1}01$$

$$e^{01}(n-1) = r_{n-1} - f_0^{10}(n-1)I_{n-1}01 - f_1^{01}(n-1)I_{n-2}01 - f_2^{01}(n-1)I_{n-3}01$$

$$f^{10}(n+1) = f^{01}(n) + \Delta e^{10}(n)I_{n-i}10$$

$$e^{10}(n) = r_n - f_0^{10}(n)I_n^{10} - f_1^{10}(n)I_{n-1}10 - f_2^{10}(n)I_{n-2}10$$

(i=0, 1, 2)

In other words, the above-described method of estimating channel characteristics for the respective states enables release from the decision delay, as well as achievement of a high speed follow up to a change in channel characteristics.

The invention has been described in detail with a particular reference to a certain embodiment thereof, but it is to be understood that modifications and variations can be effected within the scope and spirit of the invention described in the claims.

What is claimed is:

1. A maximum-likelihood sequence estimation apparatus supplied with a received signal and outputting data in accordance with a state selected on the basis of an estimated maximum-likelihood sequence, comprising:

first means supplied with a received signal and previous estimated values of channel characteristics for respective states which are a combination of possibly occurring data of a presently received signal so as to estimate a maximum-likelihood sequence using the previous estimated values of channel characteristics to output survivor sequences for the respective states; and second means responsive to the received signal and the survivor sequences for the respective states output from the first means for outputting the present estimated values of channel characteristics for the respective states.

2. The apparatus as set forth in claim 1 wherein said second means comprises:

a control means and channel characteristics estimation circuits;

said control means for receiving the survivor sequences from said first means and the present estimated values of channel characteristics for the respective states from said channel characteristics estimation circuits and outputting the survivor sequences for the respective states and previous estimated values of channel characteristics to said channel characteristics estimation circuits, and outputting the previous estimated values of channel characteristics to said first means; and said channel characteristics estimation circuits responsive to the received signal and the outputs of said control means to output the present estimated values of channel characteristics for the respective states to said control means.

3. A maximum-likelihood sequence estimation apparatus supplied with a received signal and outputting data in accordance with a state selected on the basis of an estimated maximum-likelihood sequence, comprising:

maximum-likelihood sequence estimation means supplied with a received signal and previous estimated values of channel characteristics for respective states which are a combination of possibly occurring data of a presently received signal so as to estimate a maximum-likelihood sequence using the previous estimated values of channel characteristics to output survivor sequences for the respective states; and channel characteristics estimation means receiving a received signal and the survivor sequences for the respective states output from said maximum-likelihood sequence estimation means for outputting the previous estimated values of channel characteristics for the respective states.

4. The apparatus as set forth in claim 3 wherein said maximum-likelihood sequence estimation means includes:

a maximum-likelihood sequence estimation circuit supplied with the received signal and the previous estimated values of channel characteristics for the respective states; and a control circuit receiving the survivor sequences from said maximum-likelihood sequence estimation circuit and the present estimated values of channel characteristics for the respective states from said channel characteristics estimation means so as to output the survivor sequences for the respective states and previous estimated values of channel characteristics.

5. The apparatus as set forth in claim 4 wherein said channel characteristics estimation means comprises estimation circuits, the number of which is equal to the number of the respective states, and wherein said estimation circuits are responsive to the received signal and the outputs of said control circuit to output the present estimated values of channel characteristics for the respective states.

6. A maximum-likelihood sequence estimation apparatus supplied with a received signal and outputting data in accordance with a state selected on the basis of an estimated maximum-likelihood sequence, comprising:

a maximum-likelihood sequence estimation circuit supplied with a received signal and previous estimated values of channel characteristics for respective states which are a combination of possibly occurring data of a received signal so as to estimate a maximum-likelihood sequence using the previous estimated values of channel characteristics to output survivor sequences for the respective states;

a control circuit receiving the survivor sequences from said maximum-likelihood sequence estimation circuit and the present estimated values of channel characteristics for the respective states to output the survivor sequences for the respective states and previous estimated values of channel characteristics; and channel characteristics estimation circuits responsive to the received signal and the outputs of said control circuit to output the present estimated values of channel characteristics for the respective states, the number of said channel characteristics estimation circuits being equal to the number of the respective states.

* * * * *